3,097,230
ARYL PROPIOLATES
Lee A. Miller, Dayton, Ohio, assignor to Monsanto Chemical Company, St. Louis, Mo., a corporation of Delaware
No Drawing. Filed Oct. 3, 1960, Ser. No. 59,823
13 Claims. (Cl. 260—473)

The present invention relates to esters and more particularly provides new and valuable propiolates and the method of preparing the same.

An object of the invention is the provision of aromatic esters of propiolic acid. Another object of the invention is the provision of esters of propiolic acid and monohydroxy aromatic compounds. An important objective of the invention is the provision of a method whereby aromatic propiolates are prepared directly from a phenol. Still another objective of the invention is to provide, from phenols and a propiolyl halide, aromatic propiolates having utility as light-stabilizers in synthetic resinous materials. The provision of aromatic propiolates for use in the preparation of aromatic acrylic compounds and in the manufacture of synthetic resins and plastics is a further objective of the invention.

Aliphatic esters of propiolic acid have been long known in the art. Aliphatic hydroxy groups are readily esterified by propiolic acid; but when the hydroxy group is present at an aromatic nucleus, esterification does not occur owing to the instability of propiolic acid at the high operating temperatures required for aromatic esterification.

I have found, however, that when a propiolyl halide, e.g., propiolyl chloride, bromide or iodide, is reacted with a phenol in the presence of a basic agent, esterification results. This discovery provides a means of obtaining an extensive series of aromatic propiolates. Not only do the hydrocarbon phenols participate in the reaction, but also phenolic compounds in which there are present at the aromatic nucleus one or more substituents. The present invention thus provides a method for providing aromatic propiolates, generally, the only limitation being that the phenolic compound contains no substituents which react with the propiolyl halide. Reaction of the phenol with the propiolyl halide takes place according to the scheme

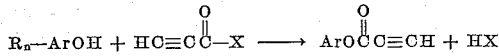

where Ar is an aromatic hydrocarbon radical of from 6 to 12 carbon atoms, R is selected from the class consisting of halogen, nitro, alkyl, alkyl—O—, (alkyl)$_2$N— and alkyl—O(O)C— wherein each alkyl radical has from 1 to 5 carbon atoms, $n$ is a number of 0 to 5, and X denotes halogen.

Propiolyl chloride, the presently preferred propiolyl halide, is obtained by reaction of propiolic acid with a saturated acyl halide, as described in my copending application Serial No. 6,344, filed February 3, 1960.

Examples of phenols which are presently useful and of the aryl propiolates, obtained according to the invention by reaction with a propiolyl halide, are shown below:

Phenol to give phenyl propiolate; α- or β-naphthol to give α- or β-naphthyl propiolate; 4-phenylphenol to give xenyl propiolate; o-, m-, or p-cresol to give o-, m- or p-tolyl propiolate; pentamethylphenol to give pentamethylphenyl propiolate; 4-butylphenol to give 4-butylphenyl propiolate; 3-hexylphenol to give 3-hexylphenyl propiolate; α-ethyl-β-naphthol to give α-ethyl-β-naphthyl propiolate; 2-, 3- or 4-nitrophenol to give 2-, 3-, or 4-nitrophenyl propiolate; 4-(2-, 3- or 4-nitrophenyl)phenol to give 2-, 3- or 4-nitroxenyl propiolate; β-nitro-α-naphthol to give β-nitro-α-naphthyl propiolate; 4-nitro-m-cresol to give 4-nitro-m-tolyl propiolate; 2-nitro-4-pentylphenol to give 2-nitro-4-pentylphenyl propiolate; 2,3-, 3,4-, 2,4-, 2,5-, 3,5- or 2,6-dinitrophenol to give the corresponding dinitrophenyl propiolates; 2,3,5-trinitrophenol to give 2,3,5-trinitrophenyl propiolate; 2-, 3- or 4-methoxyphenol to give 2-, 3- or 4-methoxyphenyl propiolate; 2-ethoxy-4-isopropylphenol to give 2-ethoxy-4-isopropylphenyl propiolate; 3,4-dibutoxyphenol to give 3,4-dibutylphenyl propiolate; 2-pentyloxy-4-nitrophenol to give 2-pentyloxy-4-nitrophenyl propiolate; 4-(2-, 3- or 4-methoxyphenyl)-phenol to give 2-, 3- or 4-methoxyxenyl propiolate; α-isopropoxy-β-naphthol to give α-isopropoxynaphthyl propiolate; pentamethoxyphenol to give pentamethoxyphenyl propiolate; 4-diethylaminophenol to give 4-diethylaminophenyl propiolate; 3-butyl-2-dimethylaminophenol to give 3-butyl-2-dimethylaminophenyl propiolate; 3-dipentylamino-4-nitrophenol to give 3-dipentylamino-4-nitrophenyl propiolate; β-dimethylamino-α-naphthol to give β-dimethylamino-α-naphthyl propiolate; 4-(4-dimethylamino-2-methoxyphenyl)phenol to give 4-(4-dimethylamino-2-methoxyphenyl)phenyl propiolate; methyl 2-, 3- or 4-hydroxybenzoate to give 2-, 3- or 4-carbomethoxyphenyl propiolate; butyl 2-hydroxy-4-nitrobenzoate to give 2-carbobutoxy-5-nitrophenyl propiolate; pentyl 3-ethoxy-4-hydroxybenzoate to give 2-ethoxy-4-carbopentyloxyphenyl propiolate; ethyl 2-diethylamino-3-ethoxy-4-hydroxybenzoate to give 2-ethoxy-3-diethylamino-4-carboethoxyphenyl propiolate; propyl 2-butyl-4-hydroxy-3-nitrobenzoate to give 3-butyl-4-carbopropoxy-2-nitrophenyl propiolate; isopropyl α-hydroxy-β-naphthoate to give β-carboisopropoxy-α-naphthyl propiolate; ethyl 4-(4-hydroxyphenyl)benzoate to give 4-carboethoxyxenyl propiolate; 2-, 3- or 4-chlorophenol to give 2-, 3- or 4-chlorophenyl propiolate; 2-, 3- or 4-bromophenol to give 2-, 3- or 4-bromophenyl propiolate; 2-, 3- or 4-iodophenol to give 2-, 3-, or 4-iodophenyl propiolate; 2-, 3-, or 4-fluorophenol to give 2-, 3- or 4-fluorophenyl propiolate; 2,3-, 3,4-, 2,4-, 2,5-, 3,5- or 2,6-dichlorophenol to give the corresponding dichlorophenyl propiolates; 2,3,4-trichlorophenol to give 2,3,4-trichlorophenyl propiolate; 3,4,5-tribromophenol to give 3,4,5-tribromophenyl propiolate; pentachlorophenol to give pentachlorophenyl propiolate; pentaiodophenol to give pentaiodophenyl propiolate; pentafluorophenol to give pentafluorophenyl propiolate; pentabromophenol to give pentabromophenyl propiolate; 2-bromo-4-chlorophenol to give 2-bromo-4-chlorophenyl propiolate; 2-chloro-4-ethoxyphenol to give 2-chloro-4-ethoxyphenyl propiolate; 3-bromo-5-butylphenol to give 3-bromo-5-butylphenylpropiolate; α-chloro-β-naphthol to give α-chloro-β-naphthyl propiolate; α-bromo-β-naphthol to give α-bromo-β-naphthyl propiolate; β-fluoro-α-naphthol to give β-fluoro-α-naphthyl propiolate; β-iodo-α-naphthol to give β-iodo-α-naphthyl propiolate; 4(4-bromophenyl)phenol to give 4-bromoxenyl propiolate; 4-(4-chlorophenyl)phenol to give 4-chloroxenyl propiolate; 4-(2-fluorophenyl)phenol to give 2-fluoroxenyl propiolate; 4-diethylamino-3-fluorophenol to give 4-diethylamino-3-fluorophenylpropiolate; 2-dibutylamino-3,4-dichlorophenol to give 2-dibutylamino-3,4-dichlorophenyl propiolate; ethyl 2-chloro-3-hydroxybenzoate to give 2-chloro-3-carboethoxyphenyl propiolate; 2-chloro-3-nitrophenol to give 2-chloro-3-nitrophenyl propiolate; tetrabromonitrophenol to give tetrabromonitrophenyl propiolate; 2-chloro-4-butoxy-3-dimethylaminophenol to give 2-chloro-4-butoxy-3-dimethylaminophenyl propiolate; etc.

Reaction of the propiolyl halide with the phenol to give the presently provided aromatic propiolates proceeds readily in the presence or absence of catalysts and/or inert diluents or solvents. Since the reaction is accompanied by the evolution of hydrogen halide as by-product, it is advantageous to provide for removal of the hydrogen halide from the reaction zone. This can be done by dephlegmation and venting, with rapid stirring, or by operating in the presence of a basic material as hydrogen halide scavenger, e.g., the alkali and alkali metal oxides or hydroxides or basically reacting salts thereof such as sodium, potassium, lithium, rubidium, cesium, calcium or magnesium hydroxide, carbonate or acetate; alkali metal alcoholates such as sodium methylate; organic bases such as N,N-dimethylaniline or N,N-diethylnaphthylamine, etc.

Reaction of the propiolyl halide with the phenolic compound to give the aromatic propiolates takes place at ordinary, decreased or increased temperatures, say, at temperatures of from about $-10°$ C. to $120°$ C., depending upon the nature of the phenol. Generally, the reaction is exothermic. Hence, it is recommended that initial runs be started at low temperatures, e.g., at around $-5°$ C. to $10°$ C., and that external heating be employed only if there is no evidence of reaction at the low or ordinary room temperatures.

A solvent or diluent, though not necessary, is also recommended. This is because in the exothermic reactions it serves to dissipate heat of reaction and because, irrespective of the temperature conditions, use of the solvent or diluent minimizes a tendency of the hydrogen halide by-product to react with the triple bond of the propiolyl halide starting material and of the propiolate product. Useful solvents for this purpose are the cycloalkanes, e.g., cyclohexane, cyclopentane or the alkyl-substituted cycloalkanes. Hydrocarbon or halohydrocarbon are also generally useful. For example, reaction of the propiolyl halide with the phenolic compound to give the aromatic propiolates may be effected in benzene, toluene, xylene, hexane, petroleum spirits, dichlorobenzene, ethylene dichloride, carbon tetrachloride, etc. Other presently useful diluents are the ketones and ethers, e.g., acetone, 2-propanone, ethyl ether, isopropyl ether, dioxane, etc.

Since formation of the presently provided aromatic propiolates proceeds by reaction of one mole of the phenolic compound with one mole of the propiolyl halide, these reactants are advantageously employed in such stoichiometric proportions. However, an excess of either the halide or the phenol may be used, since any unreacted material can be readily separated from the ester product.

The aromatic propiolates are stable, well-defined compounds which range from viscous liquids to crystalline solids, they are advantageously employed for a variety of industrial and agricultural purposes, e.g., as plasticizers and light stabilizers for synthetic resins and plastics; as biological toxicants, e.g., as fungistats, bacteriostats and herbicides; and as intermediates for the preparing of a host of substituted aromatic esters. The acetylenic bond in the presently provided esters is highly reactive. The present aryl propiolates readily react with alcohols or phenols to give aryl 3-alkoxy- or 3-aryloxyacrylates; with primary or secondary amines, e.g., aniline or dimethylamine to give aryl 3-hydrocarbylamino- or 3-dihydrocarbylaminoacrylates. Similarly, the aryl haloacrylates are prepared by the addition reaction of a hydrogen halide with the presently provided aryl propiolates.

The invention is further illustrated by, but not limited to, the following examples:

Example 1

Over a two-minute period and with rapid stirring, a solution consisting of 9.7 g. (0.11 mole, 10% excess) of propiolyl chloride in 50 ml. of benzene was added to a cooled mixture consisting of 9.4 g. (0.1 mole) of phenol, 4.0 g. (0.1 mole) of sodium hydroxide, 300 ml. of water and 50 ml. of benzene. During the addition, the temperature of the reaction mixture rose from $5°$ C. to $9°$ C., and then subsided. The whole was stirred for 15 minutes at $5°$ C. At the end of that time, 75 ml. of ether was added to the reaction mixture, the organic layer which formed was separated, and the water-layer was extracted with an additional 75 ml. of ether. The organic layer and the ether extract were combined, dried over magnesium sulfate and evaporated to remove the solvent. Distillation of the residue gave 12.1 g. of the substantially pure phenyl propiolate, B.P. $52°–53°$ C./ 0.6–0.75 mm., $n_D^{25}$ 1.5194, which analyzed 73.84% carbon and 4.44% hydrogen as against 73.96% and 4.14%, the respective calculated values for $C_9H_6O_2$.

Infrared analysis showed the following structures:

$\equiv$CH at 3200 cm.$^{-1}$
C—H aromatic at 3030 cm.$^{-1}$
C=O at 1700 cm.$^{-1}$
C—O—ester at 1200 cm.$^{-1}$

Example 2

To a cooled, rapidly stirred solution consisting of 8.6 g. (0.06 mole) of β-naphthol, 2.6 g. (0.06 mole) of sodium hydroxide, 250 ml. of water and 50 ml. of benzene there was added over a 1-minute period a solution consisting of 5.6 g. (0.0635 mole, 5% excess) of propiolyl chloride in 100 ml. of benzene. The temperature rose from $5°$ C. to $12°$ C. during addition of the chloride. After stirring the whole for 15 minutes at $5°$ C., the reaction mixture was allowed to attain room temperature. It was then extracted with three 100 ml. portions of ether. The combined ether extracts were washed successively with two 100 ml. portions of 5% aqueous sodium hydroxide and two 100 ml. portions of water. The washed material was dried over magnesium sulfate, filtered, and evaporated to give 11.6 g. of the colorless, crude β-naphthyl propiolate, M.P. 72–75° C. Recrystallization from ethanol gave the substantially pure β-naphthyl propiolate, M.P. 74–75° C., which analyzed 78.67% carbon and 4.44% hydrogen as against 79.58% and 4.11%, the respective calculated values for $C_{13}H_8O_2$.

Example 3

A solution consisting of 11.3 g. (0.127 mole) of propiolyl chloride in 100 ml. of benzene was added over a 1-minute period to a cooled (5° C.) rapidly stirred mixture consisting of 19.6 g. (0.12 mole) of 2,4-dichlorophenol, 5.1 g. (0.127 mole) of sodium hydroxide, 250 ml. of water and 50 ml. of benzene. The whole was stirred at 5° C. for 5 minutes and then allowed to attain room temperature. The benzene layer which formed was separated, the water layer was extracted with two 100 ml. portions of ether. The combined benzene layer and ether extracts were washed successively with two 100 ml. portions of 5% aqueous sodium hydroxide and two 100 ml. portions of water, dried over magnesium sulfate, filtered and finally evaporated to give 23 g. of a colorless liquid. Distillation gave 19.8 g. of the substantially pure 2,4-dichlorophenyl propiolate, B.P. 91–92° C./0.2 mm., M.P. 61–2° C., a colorless solid, which analyzed 50.51% carbon and 2.01% hydrogen as against 50.27% and 1.88%, the respective calculated values for $C_9H_4Cl_2O_2$.

Infrared analysis showed the following structures:

$\equiv$CH at 3250 cm.$^{-1}$
C$\equiv$CH at 2120 cm.$^{-1}$
C=O at 1725 cm.$^{-1}$
C=C aromatic at 1590 cm.$^{-1}$

Example 4

To a cooled (5° C.) mixture consisting of 14.9 g. (0.12 mole) of 4-methoxyphenol, 5.1 g. (0.127 mole) of sodium hydroxide, 250 ml. of water and 50 ml. of benzene there was added, during one minute, a mixture consisting of 11.3 g. (0.127 mole) of propiolyl chloride and 100 ml. of benzene. The temperature of the reaction mixture rose from 5° to 13° C. during addition of the chloride. After stirring the whole at 5° C. for 15 minutes, it was allowed to attain room temperature. The benzene layer which formed was separated, the water layer was extracted with ether, and the combined benzene layer and ether extracts were washed first with 5% aqueous sodium hydroxide and then with water. After drying the washed product over magnesium sulfate it was filtered and evaporated to give 20 g. of a yellow oil. This was distilled to give 18.5 g. of the substantially pure 4-methoxyphenyl propiolate, B.P. 90° C./0.3 mm., $n_D^{35}$ 1.5305–6, analyzing 68.00% carbon and 4.82% hydrogen as against 68.18% and 4.58%, the respective calculated values for $C_{10}H_8O_3$.

Infrared analysis showed ≡CH at 3300 cm.$^{-1}$, C≡CH at 2125 cm.$^{-1}$ and C—O-ester at 1215 cm.$^{-1}$.

Upon standing for a few days, the liquid 4-methoxyphenyl propiolate solidified to a pale yellow solid, M.P. 42–44° C.

*Example 5*

A solution of 14.2 g. (0.16 mole) of propiolyl chloride in 100 ml. of benzene was added over about 2 minutes to a rapidly stirred, cooled (5° C.) solution consisting of 20.5 g. (0.15 mole) of 3-(dimethylamino)phenol, 6.4 g. (0.16 mole) of sodium hydroxide, 150 ml. of water and 50 ml. of benzene. During the addition, the temperature of the reaction mixture rose from 5° C. to 18° C. The whole was then stirred at 5° C. for 15 minutes and then allowed to stand overnight at room temperature. The resulting benzene layer was separated and the water layer was extracted with ether. After washing the combined benzene layer and ether extracts, first with 5% aqueous sodium hydroxide and then with water, the organic solution was dried over magnesium sulfate, filtered and evaporated. Distillation of the residue gave the substantially pure 3-(diethylamino)phenyl propiolate, B.P. 126–7° C./0.4 mm.; $n_D^{25}$ 1.5611, analyzing 69.62% carbon and 6.12% hydrogen as against 69.82% and 5.86%, the respective calculated values for $C_{11}H_{11}NO_2$. Infrared analysis showed ≡CH at 3300 cm.$^{-1}$ and 2125 cm.$^{-1}$ and C—O-ester at 1215 cm.$^{-1}$.

*Example 6*

A solution of 11.3 g. (0.127 mole) of propiolyl chloride in 100 ml. of benzene was added over a 1-minute period to a cooled (5° C.) rapidly stirred solution of 16.7 g. (0.12 mole) of 4-nitrophenol, 5.1 g. (0.127 mole) of sodium hydroxide, 200 ml. of water and 50 ml. of benzene. During addition of the chloride, the temperature of the reaction mixture rose to a maximum of 14° C., and a colorless solid was formed. After stirring the whole for 15 minutes at 5° C., it was allowed to stand overnight at room temperature. The reaction mixture was filtered, and the precipitate was dried for 2 hours at 55° C./20 mm. to give 18.0 g. of the crude 4-nitrophenyl propiolate, M.P. 131–4° C. An additional 3.2 g. of product, M.P. 130–3° C. was obtained from the filtrate by extracting with ether and evaporating the extract. The products were combined and recrystallized from carbon tetrachloride to give the substantially pure 4-nitrophenyl propiolate, M.P. 132–3° C., analyzing 56.42% carbon and 2.89% hydrogen as against 56.55% and 2.64%, the respective calculated values for $C_9H_5NO_4$. Infrared analysis showed ≡CH at 3250 cm.$^{-1}$ and 2120 cm.$^{-1}$, C—O-ester at 1200 cm.$^{-1}$ and $NO_2$ at 1530 cm.$^{-1}$ and 1360 cm.$^{-1}$.

*Example 7*

To a rapidly stirred, cooled (5° C.) solution consisting of 19.9 g. (0.12 mole) of ethyl 4-hydroxybenzoate, 5.1 g. (0.127 mole) of sodium hydroxide, 200 ml. of water and 50 ml. of benzene there was added during one minute a mixture consisting of 11.3 g. (0.127 mole) of propiolyl chloride and 100 ml. of benzene. After stirring for 15 minutes at 5° C., the whole was allowed to attain room temperature. The benzene layer which formed was separated, and the water layer was twice extracted with ether. The combined benzene layer and ether extracts were then washed with 5% aqueous sodium hydroxide and water, dried over magnesium sulfate, filtered and evaporated to give a colorless oil which crystallized upon cooling to give 22.8 g. of crude product, M.P. 74–76° C. Recrystallization from ethanol and drying gave 18.0 g. of the substantially pure 4-carboethoxyphenyl propiolate, M.P. 76–7° C., analyzing 66.12% carbon and 4.83% carbon as against 66.05% and 4.62%, the respective calculated values for $C_{12}H_{10}O_4$. Infrared analysis showed ≡CH at 3250 cm.$^{-1}$ and 2120 cm.$^{-1}$ and —C—O— ester at 1280 cm.$^{-1}$ and 1210 cm.$^{-1}$.

What I claim is:
1. An ester of the formula

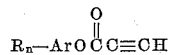

where Ar is aromatic hydrocarbon of from 6 to 12 carbon atoms, R is selected from the class consisting of halogen, nitro-, alkyl, alkyl-O-, (alkyl)$_2$N— and alkyl-O(O)C— wherein each alkyl has from 1 to 5 carbon atoms, and $n$ is a number of 0 to 5.

2. Haloaryl propiolate wherein aryl is hydrocarbon and has from 6 to 12 carbon atoms.

3. Nitroaryl propiolate wherein aryl is hydrocarbon and has from 6 to 12 carbon atoms.

4. Alkoxyaryl propiolate wherein aryl is hydrocarbon and has from 6 to 12 carbon atoms and alkoxy has from 1 to 5 carbon atoms.

5. (Dialkylamino)aryl propiolate wherein aryl is hydrocarbon and has from 6 to 12 carbon atoms and each alkyl has from 1 to 5 carbon atoms.

6. Carboalkoxyaryl propiolate wherein aryl is hydrocarbon and has from 6 to 12 carbon atoms and alkoxy has from 1 to 5 carbon atoms.

7. Phenyl propiolate.
8. β-Naphthyl propiolate.
9. 2,4-dichlorophenyl propiolate.
10. 4-methoxyphenyl propiolate.
11. 3-dimethylaminophenyl propiolate.
12. 4-nitrophenyl propiolate.
13. 4-carboethoxyphenyl propiolate.

References Cited in the file of this patent

UNITED STATES PATENTS 2,345,006    Ross et al.    Mar. 28, 1944
2,477,293    Filachione et al.    July 26, 1949

OTHER REFERENCES

Hackh's Chemical Dictionary (Philadelphia, 1944), pages 74, 78, 598, 714–5.

Johnson: Acetylenic Compounds, volume II (London, 1950), pages 93–4.

Schmidt: "Organic Chemistry," page 504, 7th edition, Oliver and Boyd, London, 1955.

Fieser et al.: Advanced Organic Chemistry (New York, 1961), pages 904–928.